United States Patent
Appeldorn

[19]

[11] Patent Number: 5,841,209
[45] Date of Patent: Nov. 24, 1998

[54] DRIVING AXLE FOR AN INDUSTRIAL TRUCK

[75] Inventor: Matthias Appeldorn, Hamburg, Germany

[73] Assignee: Still GmbH, Germany

[21] Appl. No.: 674,156

[22] Filed: Jul. 1, 1996

[30] Foreign Application Priority Data

Jul. 5, 1995 [DE] Germany .................. 195 24 524.5

[51] Int. Cl.[6] .................................................. H02K 5/00
[52] U.S. Cl. ............................ 310/89; 310/89; 310/91; 180/65.5; 180/11; 180/256
[58] Field of Search ................... 310/89, 91; 180/65.5, 180/11, 256

[56] References Cited

U.S. PATENT DOCUMENTS

| | | | |
|---|---|---|---|
| 4,930,590 | 6/1990 | Love et al. | 180/55 |
| 5,020,615 | 6/1991 | Asaoka | 180/11 |

FOREIGN PATENT DOCUMENTS

| | | |
|---|---|---|
| 598214 | 2/1948 | United Kingdom . |
| 1542215 | 3/1979 | United Kingdom . |

Primary Examiner—Steven L. Stephan
Assistant Examiner—Thanh Lam
Attorney, Agent, or Firm—Thomas R. Shaffer, Esq.

[57] ABSTRACT

An industrial truck, in particular a fork-lift truck, has a driving axle which is fixed to the industrial truck at two mounting locations at least. A rotor of an electric propulsion motor is disposed within an axle housing (3a, 3b, 3c) of the driving axle. At least at one end, the rotor of the propulsion motor is mounted rotatably on a bearing bracket (17) fixed to the axle housing. The bearing bracket (17) is detachably fixed to the axle housing (3a, 3b, 3c) and the mounting locations (1, 13) are disposed on the axle housing (3a, 3b, 3c). In one embodiment of the invention, the bearing bracket (17) exhibits an offset form and in the axial direction the area of the bearing bracket (17) fixed to the axle housing (3a) is a greater distance from the rotor (10) than the area of the bearing bracket (17) on which the rotor (10) is mounted.

7 Claims, 2 Drawing Sheets

DRIVING AXLE FOR AN INDUSTRIAL TRUCK

BACKGROUND OF THE INVENTION

1. Field of the Invention

The present invention relates to industrial vehicles and particularly, concerns an industrial truck with a driving axle which is fixed to the industrial truck at at least two mounting locations and with an electric propulsion motor disposed inside an axle housing of the driving axle and having at least one rotor, the rotor of the propulsion motor being mounted rotatably at at least one of its axial ends on a bearing bracket fixed to the axle housing.

2. Description of the Prior Art

Such driving axles with integral electric propulsion motors are used for example in fork-lift trucks. There, the driving axle is fixed to the frame of the industrial truck. If necessary, a lifting framework can be disposed in the area of the driving axle and can also be fixed to it.

The rotor is mounted inside the driving axle by means of a shaft coaxial with the rotor, which shaft is connected in a rotationally fixed manner to the rotor and mounted rotatably relative to the axle housing. The roller bearings normally employed for this are supported on a bearing bracket fixed to the axle housing. The stator of the propulsion motor can be formed at least partly by the axle housing. The axle housing is closed at the ends on both sides by two wheel hub housings.

In one specific variant of a driving axle of this type, the rotary movement of the rotor is transmitted by a hollow propeller shaft to a differential assembly. From the differential assembly spur gear assemblies disposed at both ends of the driving axle are driven by means of two half-shafts. The half-shaft leading to the end of the driving axle remote from the differential assembly is disposed inside the hollow propeller shaft of the rotor. Such a driving axle is disclosed in German Patent DE 43 00 45.

The driving axle is connected to the industrial truck at at least two mounting locations. These mounting locations often take the form of lugs extending from the driving axle. The driving axle is secured by these lugs to the frame of the industrial truck, e.g. by means of threaded connections. The driving axle thus forms a load-bearing part of the frame, particularly when the lifting framework is fixed directly to the driving axle.

With the driving axles known to date, the propulsion motor is only accessible when the driving axle is removed. Therefore, removal of the entire driving axle is necessary if the rotor of the propulsion motor is to be removed. For this it is necessary to detach the entire lifting framework from the industrial truck, in addition the entire frame of the industrial truck must be established or supported from the outside. This work can only be carried out in workshops which have the required equipment, in particular, lifting gear and cranes.

SUMMARY OF THE INVENTION

The underlying object of the present invention is to provide an industrial truck in which the rotor of the propulsion motor can be installed and removed without the use of expensive workshop equipment.

This object is achieved according to the invention in that the bearing bracket is fixed detachably to the axle housing and in that the mounting locations are disposed on the axle housing.

Thus, the bearing bracket is a component which is detachable from the axle housing. The fact that the driving axle is fixed to the industrial truck with the mounting locations disposed on the axle housing means that the bearing bracket can be removed from the axle housing with the rotor mounted on it. This arrangement of the bearing bracket and the mounting locations makes it possible to install or remove the rotor of the propulsion motor located inside the driving axle with the driving axle in situ. The time necessary for work on the rotor of the propulsion motor is therefore considerably reduced. The cost involved is also reduced in that only relatively simple tools are needed.

In one advantageous development of the invention, the bearing bracket is fixed to one end of the axle housing. With this arrangement of the bearing bracket, this can be withdrawn from the axle housing in the axial direction together with the shaft and the rotor.

One expedient embodiment of the invention is characterized in that the bearing bracket is fixed to the axle housing by means of a screwed connection. The screwed connection serves to secure the bearing bracket to the axle housing and also to center the mounting of the rotor in the axial and radial directions.

It is particularly advantageous when the bearing bracket has an offset form and in the axial direction the area of the bearing bracket fixed to the axle housing is a greater distance from the rotor than the area of the bearing bracket on which the rotor is mounted. As a result of giving the bearing bracket this form, the breadth of support of the driving axle on the industrial truck is increased at the two mounting locations. At the same time, a minimal distance between the bearings is achieved for the mounting of the rotor.

It is particularly expedient when the axle housing is formed with at least one recess which is disposed on the circumferential side and through which carbon brushes disposed inside the axle housing can be installed and removed. The carbon brushes must be removed through the recesses in the axle housing before the rotor is removed. Thus, the carbon brushes can also be renewed while the rotor is in situ.

It is particularly advantageous when the axle housing has an opening at the end through which the rotor can be withdrawn from the axle housing in at least one rotary position. When it is removed, the rotor is withdrawn from the axle housing through the opening in the end of the axle housing. If the opening and the rotor do not have circular cross-sections, the rotor must be rotated about its axis of rotation into a rotary position aligned with the opening so that it may be withdrawn through the opening in the axial direction.

BRIEF DESCRIPTION OF THE DRAWINGS

Further advantages and details of the invention will be explained in detail with reference to the embodiment example shown in the accompanying diagrammatic Figures, in which.

DETAILED DESCRIPTION OF THE PREFERRED EMBODIMENT

Figure 1:
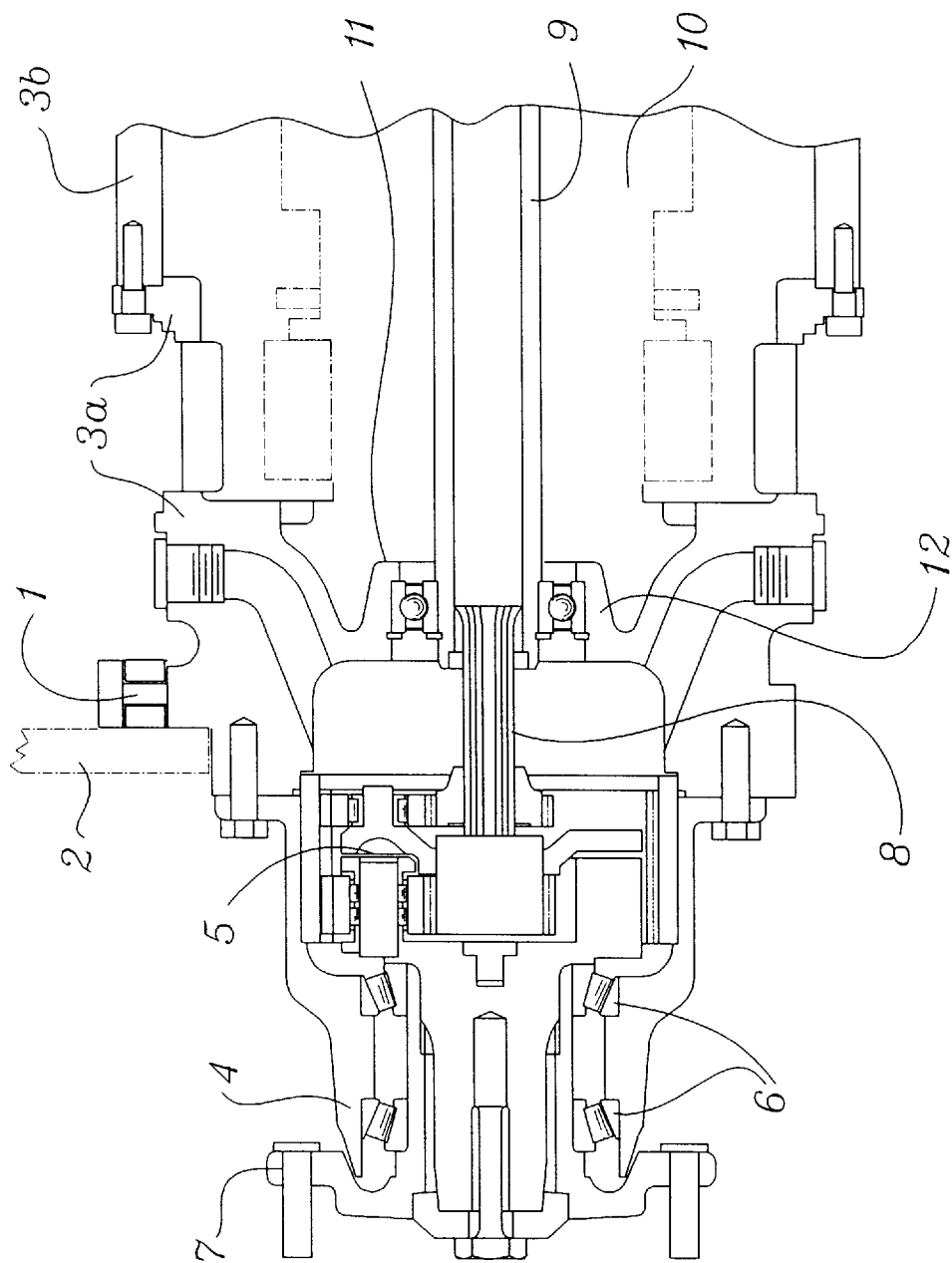
FIG. 1 shows a conventional driving axle of this type.

A driving axle of this type for an industrial truck according to the state of the art is shown in FIG. 1. The figure shows one of two mounting locations 1 at which the driving axle is fixed to the frame 2 of the industrial truck. The mounting locations are part of a housing part 3a of the driving axle. A further housing part 3b of the driving axle adjoins the housing part 3a, a wheel hub housing 4 which surrounds a spur gear assembly 5 and its mounting 6 is fixed. A wheel flange 7 is fixed on the output side of the spur gear assembly while the input side of the spur gear assembly 5 is connected to a half-shaft 8.

A hollow propeller shaft 9, on which the rotor 10 of the electric propulsion motor 25 is secured in a rotationally fixed manner, is disposed coaxially with the half-shaft 8. The hollow shaft 9 is mounted rotatably on a bearing bracket 12 with a roller bearing 11. The bearing bracket 12 is formed from the housing part 3a, i.e. fixed undetachably to the axle housing.

In order to be able to remove the rotor 10 from the housing of the driving axle, the housing part 3a must be separated from the housing part 3b. The rotor 10 can then be withdrawn from the housing part 3b together with the hollow shaft 9 and the roller bearing 11 on the housing part 3a. However, the housing part 3a can only be separated from the housing part 3b when the driving axle is removed since the position of the housing part 3a is fixed by the frame 2 of the industrial truck when in situ. Thus, repairs to the rotor 10 involve extensive additional work such as the removal of the driving axle from the frame of the industrial truck and possibly the removal of a lifting framework.

Figure 2:
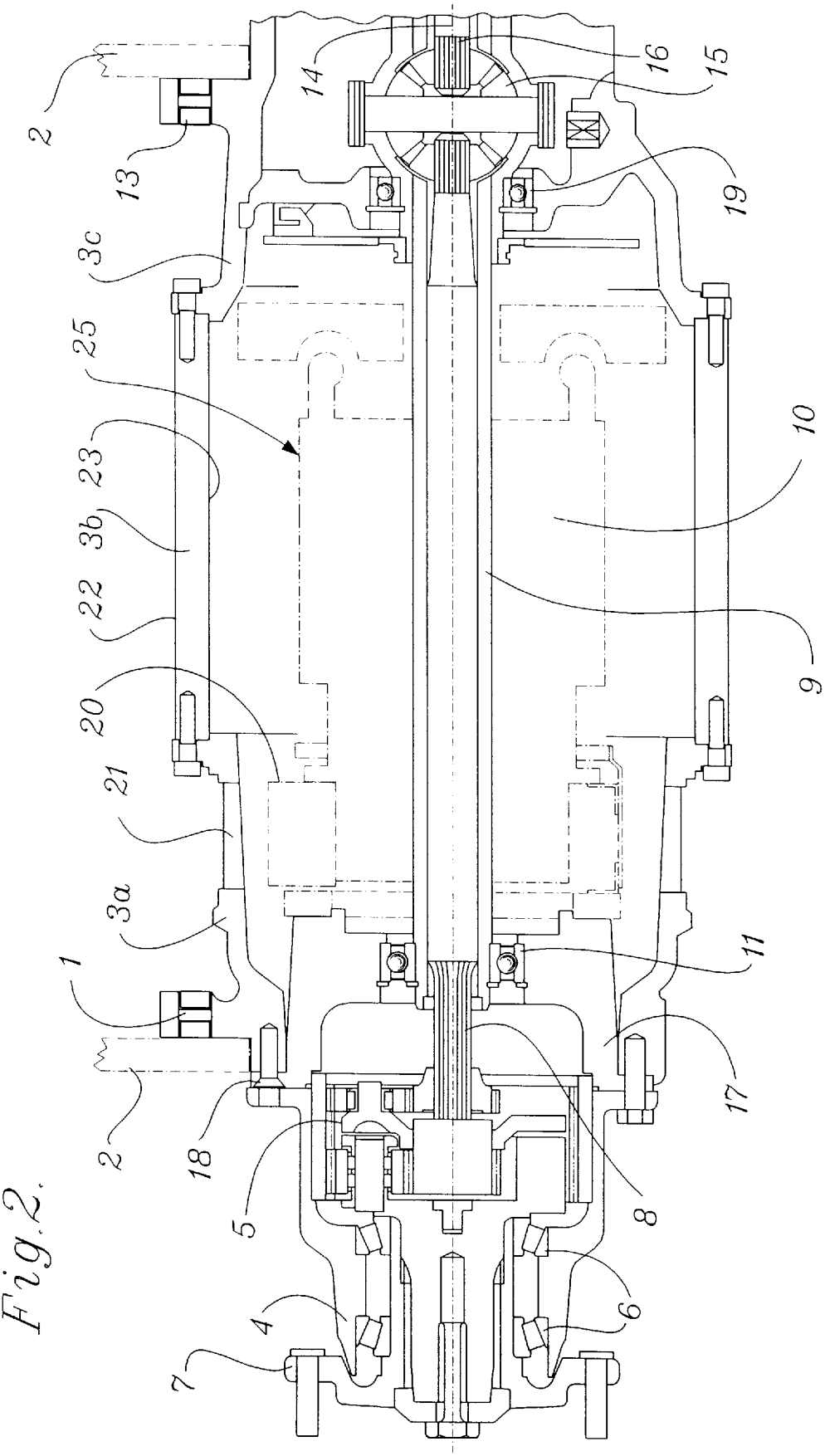
FIG. 2 shows a driving axle according to the present invention.

A driving axle according to the invention is illustrated in FIG. 2. The housing of the driving axle according to the invention is also constructed of a plurality of housing parts 3a, 3b and 3c and has an exterior portion 22 and an inside portion 23. The housing part 3a lies adjacent the wheel hub housing 4, with the spur gear assembly 5 and its mounting 6 and the wheel flange 7. As can be seen in the figure, the half-shaft 8 carries a sun gear, a planet gear is carried by the wheel hub and an annulus or ring gear is fixed to the hub housing 4. These parts form a planetary reduction gear between the half-shaft 8 and the hub 7.

The driving axle is connected to the frame 2 of the industrial truck by means of the two mounting points 1 and 13 which are disposed on the housing parts 3a and 3c. The housing parts 3a and 3c are located on the left and the right respectively of the housing part 3b. Within the housing the rotor 10 is fixed on a hollow shaft 9 and mounted rotatably with the roller bearings 11 and 19. When the propulsion motor is running, the rotor 10 rotates about its rotational axis 14. The rotary movement of the rotor is transmitted via the hollow propeller shaft 9 to a differential assembly 15. The half-shafts 8 and 16 are driven from this differential assembly 15. The spur gear assembly 5 for driving a left-hand wheel adjoins the half-shaft 8 and a further spur gear assembly (not shown) is provided on the half-shaft 16 for driving a right-hand wheel.

According to the invention, the bearing bracket 17 is detachably fixed to the housing part 3a, the mounting location 1 being disposed on this housing part 3a. As a result of this arrangement, after removal of the wheel hub housing 4, the bearing bracket 17 is freely accessible. The bearing bracket 17 is offset or dished so that the axial distance between the bearings supporting the hollow propeller shaft 9 of the rotor 10 is reduced. When the retaining and centering screws 18 have been released, the bearing bracket 17 can be withdrawn through the opening at the end of the housing part 3a from the inside portion 23 of the axle housing together with the roller bearing 11, the hollow propeller shaft 9 and the rotor 10. For this, carbon brushes 20 disposed at the commutator end of the rotor must first be removed through the radial openings 21 in the housing part 3a. If the rotor and/or the opening are of irregular shape in transverse cross-section, it may initially be necessary to bring the rotor 10 into a suitable angular position relative to the rotational axis 14 in order to be able to pull or push the rotor through the opening at the axial end of the housing part 3a.

All these steps necessary for removing or installing the rotor can be carried out while the driving axle is fixed to the frame of the industrial truck. The result is a considerable saving in cost and time.

While certain presently preferred embodiments of the present invention have been described and illustrated, it is to be distinctly understood that the invention is not limited thereto but may be otherwise embodied and practiced within the scope of the following claims.

I claim:

1. An industrial truck comprising:
   an axle housing (3a, 3b, 3c) having an exterior portion and an inside portion, said axle housing having mounting locations (1, 13) disposed thereon;
   a driving axle which is fixed to the industrial truck at at least two mounting locations and positioned within said inside portion of said axle housing;
   a bearing bracket (17) detachably fixed to said axle housing;
   an electric propulsion motor having at least one rotor disposed within said inside portion of said axle housing, said rotor of the propulsion motor being mounted rotatably at least at one axial end on said bearing bracket.

2. An industrial truck according to claim 1, wherein said bearing bracket (17) is fixed to one end of said axle housing (3a, 3b, 3c).

3. An industrial truck according to claim 1, wherein said bearing bracket (17) is fixed to said axle housing (3a, 3b, 3c) by means of a screwed connection (18).

4. An industrial truck according to claim 1, wherein said bearing bracket (17) exhibits an offset form and, in an axial direction, the location where the bearing bracket (17) is fixed to the axle housing (3a, 3b, 3c) is a greater distance from the rotor (10) than is the the location where the rotor (10) is mounted to the bearing bracket (17).

5. An industrial truck according to claim 1, wherein said axle housing (3a, 3b, 3c) has at least one radially facing opening (21) through which carbon brushes (20) disposed within the axle housing (3a, 3b, 3c) can be installed and removed.

6. An industrial truck according to claim 1, wherein said axle housing (3a, 3b, 3c) has an axially facing opening at the end through which the rotor (10) can be withdrawn from the axle housing (3a, 3b, 3c) in at least one rotary position relative thereto.

7. An axle assembly for an industrial truck, comprising an axle housing and an electric propulsion motor having at least one rotor disposed within the axle housing, the axle housing being fixed to the industrial truck at at least two mounting locations disposed on the axle housing (3a, 3b, 3c), the rotor of the propulsion motor being mounted rotatably at least at one of its axial ends on a bearing bracket (17) fixed to the axle housing, and wherein the bearing bracket (17) is fixed detachably to the axle housing (3a, 3b, 3c), whereby when the bearing bracket is removed from the housing, an axially directed opening having a transverse cross-section larger than that of the rotor is formed in the axle housing.

\* \* \* \* \*

UNITED STATES PATENT AND TRADEMARK OFFICE
CERTIFICATE OF CORRECTION

PATENT NO. : 5,841,209
DATED : November 24, 1998
INVENTOR(S) : Matthias Appeldorn It is certified that error appears in the above-identified patent and that said Letters Patent is hereby corrected as shown below:

Column 3, Line 29, "3cand" should read "3c and"
Column 3, Line 62, "3afrom" should read "3a from"

Signed and Sealed this

Twenty-third Day of February, 1999

Attest:

Q. TODD DICKINSON

Attesting Officer

Acting Commissioner of Patents and Trademarks